Fig. 1

Dec. 18, 1945.  H. W. PRICE  2,391,192
CLUTCH CONTROL MECHANISM
Filed June 14, 1943  4 Sheets-Sheet 2

INVENTOR.
HAROLD W. PRICE
BY H. O. Clayton
ATTORNEY

Dec. 18, 1945.    H. W. PRICE    2,391,192
CLUTCH CONTROL MECHANISM
Filed June 14, 1943    4 Sheets-Sheet 3

INVENTOR
HAROLD W. PRICE
BY
ATTORNEY

UNITED STATES PATENT OFFICE 2,391,192

CLUTCH CONTROL MECHANISM

Harold W. Price, South Bend, Ind., assignor to Bendix Aviation Corporation, South Bend, Ind., a corporation of Delaware Application June 14, 1943, Serial No. 490,728

20 Claims. (Cl. 192—.01)

This invention relates in general to mechanism for operating the friction clutch of an automotive vehicle, said clutch including a driving element operably connected to the internal combustion engine of the vehicle, a driven element operably connected to the change-speed mechanism or other driven mechanism of the vehicle and yieldable means, such as the conventional clutch springs, operable to force said driving and driven elements into engagement with each other to thereby effect an engagement of the clutch. More particularly my invention relates to a friction clutch operating power means including a pressure differential operated motor, the movable power element of which is connected to one of the aforementioned clutch elements and is operable to bodily move, against the tension of said yieldable means, said latter element away from the other clutch element, said motor being in large measure controlled by a pressure balanced follow-up valve which is actuated by means including a spring, a pressure differential operated motor and an internal combustion engine operated governor.

One object of my invention is to provide a simple and compact power means for operating, in conjunction with an operation of the engine throttle and the change-speed transmission of the vehicle, the aforementioned conventional friction clutch of an automotive vehicle, said power means closely simulating, in its operation of said clutch, a skillful manual operation of such a clutch.

Yet another object of my invention is to provide, in an automotive vehicle wherein the accelerator is connected to the engine throttle by a lost motion connection, power means, operative after the engine throttle is completely closed and the accelerator of the vehicle is almost completely released, to disengage the friction clutch of an automotive vehicle by bodily moving, against the tension of a clutch engaging yieldable means, a driven clutch element away from a driving clutch element said power means being thereafter operative, upon depressing the accelerator, to control the engagement of said friction clutch by effecting first a relatively rapid expansion of said yieldable means and a corresponding relatively rigid movement of the driven clutch element, said movement being automatically terminated before the throttle is opened and when the potential energy of said yieldable means is diminished to a predetermined factor, the driving and driven elements being then separated a relatively short distance apart. It is a further object of my invention to so construct said power means that, upon further depressing the accelerator to effect a certain speed of the engine and a governor operated thereby, there results a control of the clutch springs or their equivalent to effect a certain loading of the clutch elements, said loading being directly proportioned to the speed of the governor until the clutch elements are fully loaded by the action of the yieldable means.

There is thus provided by my invention power means for accurately simulating a correct manual engagement of a conventional friction clutch as the engine throttle is opened to speed up the engine and get the vehicle under way; for which such a manual operation of the throttle and clutch the latter is engaged, by releasing the foot-operated clutch pedal, in accordance with the degree of depression of the accelerator which in large measure controls the degree of engine torque. The engine speed, however, is directly proportional to the engine torque; accordingly, with my invention, the degree of loading of the clutch elements is directly proportional to the engine torque which is of course the desired control of the clutch, said control being even more effective and efficient than the aforementioned manual control of the clutch as the accelerator is depressed.

Yet another object of my invention is to provide power means for controlling the clutch springs of a conventional friction clutch, said power means including a pressure differential operated motor which controls the expansion of said clutch springs as the clutch is being engaged said motor being in a measure controlled by said clutch springs.

A further object of my invention is to provide power means for effecting a controlled disengagement and a controlled engagement of the friction clutch of an automotive vehicle, said clutch including yieldable means normally biasing a bodily movable clutch element into engagement with a second clutch element, said power means comprising a pressure differential operated motor, the power element of which so controls the expansion of said yieldable means as to effect a clutch engaging operation thereof in two stages, the first stage constituting a relatively rapid expansion of the yieldable means until the movable clutch element is just out of contact with the second clutch element and the second stage constituting a series of expanding operations of the yieldable means as the speed of the engine of the vehicle is progressively increased by a series of steps.

My invention also contemplates the provision of a friction clutch operating pressure differential operated motor, the clutch engaging and clutch disengaging operations thereof being controlled by a pressure balanced follow-up valve, the operation of said valve being in large measure controlled by an engine speed responsive governor.

Yet another object of my invention is to provide a pressure differential operated motor for for operating the friction clutch of an automotive vehicle, said motor being controlled by a pressure balanced valve which is actuated by means including an engine operated governor, a spring and a pressure differential operated motor, said valve actuating means being controlled by an operation of the springs of the clutch, an operation of the engine of the vehicle and an operation of means controlled by the operation of the accelerator.

Yet another object of my invention is to provide a power means for operating the friction clutch of an automotive vehicle, said means serving to closely simulate in its operation the conventional manual operation of said clutch, particularly the engagement thereof as the throttle is being opened.

A further object of my invention is to provide a vacuum operated motor for operating the friction clutch of an automotive vehicle, the clutch engaging operation of said motor being in large part controlled by a power operated follow-up valve operative in accordance with the speed of the engine of the vehicle.

Yet another object of my invention is to provide a vacuum operated clutch operating motor controlled in part by a valve operative in accordance with the speed of the engine and operable, after and only after the accelerator is depressed a certain amount, to control the clutch engaging operation of said motor by controlling the amount of air admitted to one of the compartments of said motor.

A further object of my invention is to provide power means for operating the friction clutch of an automotive vehicle said power means including a vacuum motor having its power element connected with the clutch. This motor is controlled by a power operated three-way valve said valve being actuated by an engine speed responsive governor, a spring and a pressure differential operated motor and operative, when the accelerator is depressed, to so control the clutch springs as to effect first a relatively fast and uniform clutch engaging movement of the power element of the motor and then effect a step by step clutch engaging movement of said power element.

My invention also contemplates the provision of a vacuum motor for operating the friction clutch of an automotive vehicle, said motor being in large part controlled by a power operated three-way valve, the clutch engaging operation of said valve being initiated by the deenergization of a solenoid which operation is effected when the accelerator of the vehicle is depressed a slight amount.

One of the most important objects of my invention is to provide power means for operating the friction clutch of an automotive vehicle said means serving to so control the expansion and contraction of the clutch springs when the clutch is being engaged and disengaged respectively as to effect a loading of the clutch plates, the degree of said loading being directly proportional to the speed of the engine of the vehicle, said power means being further operative to effect a compression of the clutch springs at a relatively rapid and uniform rate to separate the driving and the driven elements of the clutch and to effect an expansion of the clutch springs at a relatively rapid and uniform rate to bring said plates into close proximity but just short of contact with each other.

Other objects and features of my invention will be apparent during the course of the following description.

In describing this invention, reference is had to the accompanying drawings in which like characters designate corresponding parts in all the views.

Figure 1:
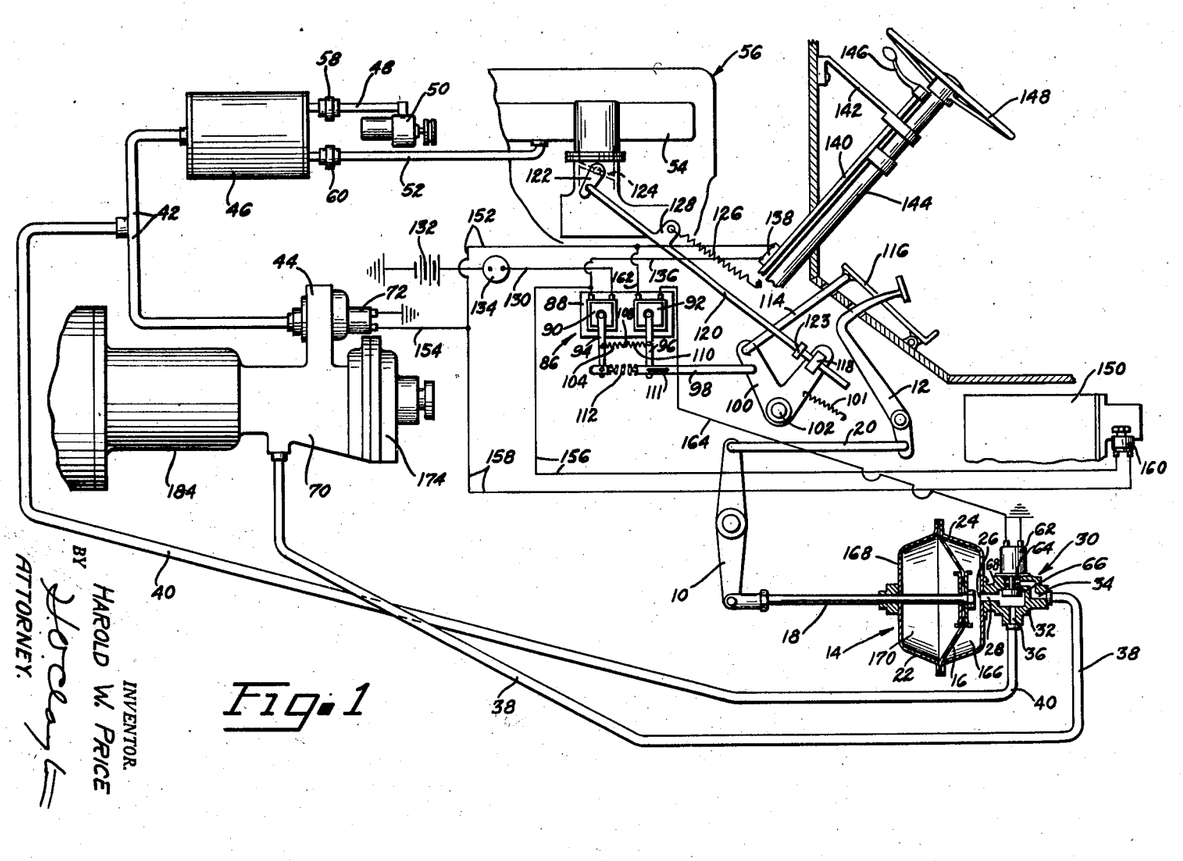
Figure 1 is a diagrammatic view disclosing the principal elements of the preferred embodiment of my invention.

Referring now to Figure 1 disclosing a preferred embodiment of my invention, a friction clutch, not shown, is operated by a crank 10, said crank being rotated to disengage the clutch either by a manually operated clutch pedal 12 or a single acting vacuum motor 14. The power element 16 of his motor is connected to the crank 10 by a rod 18 and the clutch pedal is connected to said crank by a rod 20. The friction clutch is of standard construction including a driving plate, a driven plate, and yieldable means operable to force said plates together to engage the clutch. As will be brought out in the description to follow, the clutch plate engaging yieldable means is of a predetermined strength and this feature constitutes an important part of my invention. The vacuum motor 14 preferably comprises a casing including parts 22 and 24, the latter part being provided with an opening 26 registering with a duct 28 in a so-called three-way first stage valve 30 secured to the casing part 24. The valve 30, no claim to which is made, includes a casing 32 comprising ducts 34 and 36, the former registering with a conduit 38 and the latter with a conduit 40. The conduit 40 is preferably connected to a conduit 42 which is connected at one of its ends to a so-called three-way vacuum cut-out valve 44 disclosed in detail in Figure 2 and at its other end to a vacuum reservoir 46. This reservoir is preferably connected, by a conduit 48 with a vacuum pump 50 and by a conduit 52 with the intake manifold 54 of the internal combustion engine 56 of the vehicle. Check valves 58 and 60 are preferably incorporated in the conduits 48 and 52 respectively, said valves serving to maintain the desired evacuation of the reservoir in the event of failure of operation of either the pump or manifold or both. The reservoir 46 and pump 50 may be omitted in the mechanism constituting my invention and the valves 44 and 30 connected directly to the intake manifold. Preferably, however, the reservoir is included in the mechanism inasmuch as there is thus provided at all times a constant or substantially constant source of vacuum which, as will be brought out hereinafter, facilitates the controlled clutch disengaging operation of the motor.

The first stage valve 30 is operated by a grounded solenoid 62 and a spring 64, the former when energized moving a valve member 66 upwardly to a seat 68 thereby cutting off the air transmitting connection between the conduit 38 and the duct 28 and establishing an air transmitting connection between the conduit 40 and said duct. When the solenoid 62 is deenergized, the valve member 66 is moved downwardly by the spring 64 thereby cutting off the air transmitting connection between the conduit 40 and duct 28 and establishing an air transmitting connection between the conduit 38 and said duct.

As disclosed in Figure 2, the vacuum cut-off three-way valve 44, which is mounted on the hereinafter described so-called second stage three-way controlled valve 70, is also operated by a grounded solenoid and a spring 74. This solenoid, indicated by the reference numeral 72, serves when energized to move a valve member 75 to the right, thereby cutting off an air transmitting connection between a duct 76 leading to an air cleaner 78 and a duct 80. The latter duct serves to interconnect a central compartment 82 of the valve 44 with a recessed portion of a spool-shaped valve member 84 constituting a part of the aforementioned second stage control valve 70. When the solenoid 72 is deenergized the spring 74 serves to move the valve member 75 to the left, Figure 2, thereby cutting off the air transmitting connection between the duct 80 and the conduit 42 and establishing an air transmitting connection between said duct and the atmosphere via the duct 76 and the air cleaner 78.

Describing now the electrical means for controlling the operation of the solenoids 62 and 72, said means includes a switch mechanism indicated as a whole by the reference numeral 86 in Figure 1. This switch mechanism which is housed within a box 88 includes two separate breaker switches 90 and 92 of standard design, each comprising a movable contact and two fixed contacts. The movable contacts of the switches 90 and 92, which of course move into contact with the fixed contacts to close the switches, are operated respectively by two separate cranks 94 and 96 connected at their lower ends to one end of a link 98, the latter being pivotally connected at its other end to a bell crank lever 100 which is pivotally mounted upon a fixed pivot 102, and biased to the right by a return spring 101. A spring 104 is connected to a pin 108 and the crank 94 and a spring 110 is connected to said pin and the crank 96. The crank 94 is pivotally connected at its lower end to the end of the link 98 and a pin extending laterally from the end of the crank 96 extends through a slot 111 in the link 98. A portion 112 of the link 98 located between the cranks 94 and 96 is of yieldable material such as a spring. One arm of the bell crank lever 100 is pivotally connected at its upper end to a link 114 which is pivotally connected at its other end to one end of the accelerator 116 of the vehicle. To the upper end of the other arm of the bell crank lever 100 there is secured a boss 118 having an opening therein to slidably receive one end of a link 120 pivotally connected at its upper end to one end of a crank 122; and said crank serves to rotate the throttle valve 124 of the engine carburetor. A stop 123, adjustably secured to the link 120 is contacted by the boss 118 to effect an opening of the throttle said opening being effected after the accelerator has been depressed a predetermined amount. A spring 126, connected to a boss 128 secured to the link 120, serves to return the throttle to its closed positions and the aforementioned spring 101 serves to rotate the lever 100 clockwise to effect the closing of the switches 90 and 92.

Describing now the operation of the throttle 124 and the switches 90 and 92 when the accelerator is depressed a very slight amount, and before the boss 118 contacts the stop 123 to open the throttle, there results an opening of the switch 92 by the contraction of the spring 110 said spring, which is weaker than the spring 101, having been expanded when the accelerator is fully released. Continued depression of the accelerator serves to continue the rotation of the bell crank lever 100 until the boss 118 contacts the stop 123 thereby resulting in a rotation of the crank 122 to open the throttle; and the parts of the mechanism, particularly the strength of the yieldable member 112, are so constructed and arranged that when the accelerator has been depressed sufficiently to effect, say one-fourth of the opening of the throttle, then the switch 90 is opened. Describing in greater detail the means for operating the latter switch the yieldable member 112 is of such a strength that it compresses before the spring 104 is expanded which operation, by virtue of the compression of the member 112, occurs after the one fourth opening of the throttle has been completed. The member 112 is solid as the spring 104 is being expanded and it follows that continued depression of the accelerator serves to continue the opening of the throttle. The purpose of this timing of operation of the throttle and switches 90 and 92 will become apparent when the operation of the entire mechanism is described hereinafter.

As to the wiring interconnecting the switches 90 and 92 and the grounded solenoids 72 and 62, a so-called hot wire 130 from a grounded battery 132 is connected to the accelerator operated switch 90. The ignition switch 134 of the engine controlling ignition system is included in this electrical connection to prevent an unnecessary drain on the battery when the car is not in use. The switch 90 is connected by a wire 136 to a switch 138 operated by means including a rod 140 secured by a bracket 142 to the steering column 144 of the vehicle; and to the end of the rod 140 there is connected a gearshift and clutch control selector lever 146 extending beneath the steering wheel 148 and parallel or substantially parallel thereto. The rod 140 and lever 146 constitute a part of means for controlling the operation of the change gear or so-called step type transmission 150 of the vehicle, said transmission operating means constituting no part of my invention. The parts of the switch 138 and transmission operating means are preferably so constructed and arranged as to effect an operation of said switch when and only when the selector lever 146 is moved in one of its planes of movement to establish or prepare for the establishment of the transmission in a relatively high gear ratio forward speed setting. The operating means for the switch 138 is preferably so constructed that said switch is closed during the initial movement of the selector lever 146 and opened when the driver removes his hand from said lever after the setting of the transmission has been completed. If the transmission to be operated is of the standard three-speeds forward and reverse type operated by means including a selector lever movable in three planes, then the switch 138 and the selector lever operated means for operating the same are so constructed that the latter is operated when and only when the selector lever is moved in the plane to establish the transmission in either second or high gear; and if the selector lever is moved only in one plane in the operation of establishing the transmission in all of its forward speed settings, then when said lever is moved in this plane, the switch is operated to close and open the same. It follows therefore that the switch 138, which of itself constitutes no part of my invention, is of one construction if the selector lever is moved to but one operative position in the plane of movement in which the switch is operative and said switch is of a different construction if the selector lever is moved to two different operative positions in the plane of movement in which the switch is operative. As to the operation of the friction clutch to facilitate the establishment of the transmission in reverse gear, it is to be observed that the selector lever, with practically all transmission operating means of the day, is moved in a plane different from the plane in which the selector lever is moved to establish the transmission in its relatively high forward speed settings; and with applicant's invention, as will be described hereinafter, there is provided a vehicle speed responsive governor constituting part of means for effecting a clutch disengaging operation of the motor 14 when the vehicle is at a standstill. With the mechanism of my invention the clutch is therefore disengaged prior to an operation of the transmission to establish the same in reverse gear. Incidentally this governor control means also automatically effects a disengagement of the clutch by the motor 14 to facilitate a relatively low gear setting of the transmission when the vehicle is travelling below a certain speed.

Figure 3:
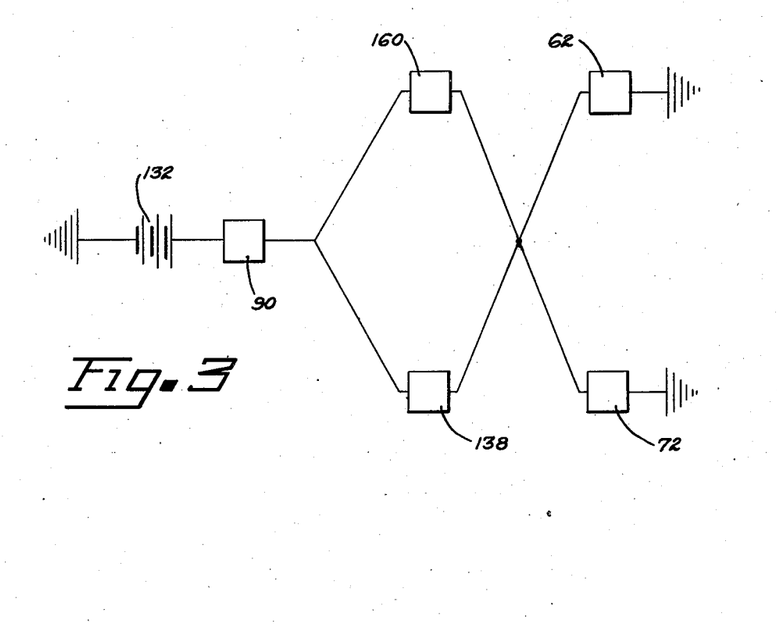
Figure 3 is a view disclosing the electrical hook-up of the switches and solenoids disclosed in Figure 1.
Figure 4:
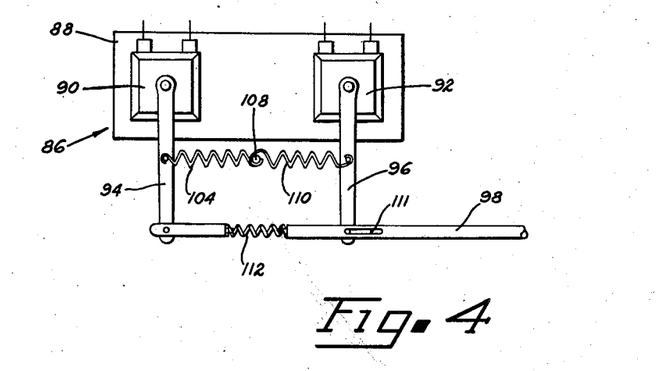
Figure 4 is an enlarged view of the accelerator operated switch operating mechanism disclosed in Figure 1.

Continuing the description of the wiring of my invention, wires 152 and 154 serve to connect the switch 138 with the grounded solenoid 72 and wires 156 and 158 together with the wire 154 serve to interconnect the switch 90, a vehicle speed responsive governor operated switch 160 and the solenoid 72. The governor operated switch 160, which is standard design, is constructed to be closed by a vehicle speed responsive governor, not shown, when the speed of the vehicle is reduced to a certain factor. As disclosed in Figure 3 the switches 138 and 160 are therefore wired in parallel in the electrical means interconnecting the switch 90 and solenoid 72 thereby providing means for opening the valve 44 to effect a disengagement of the clutch when the accelerator is released and either the selector lever 146 is moved in a certain plane or the vehicle speed is reduced to a certain factor. This operation of the mechanism will be described in greater detail hereinafter.

As to the electrical means for controlling the operation of the valve operating solenoid 62, a wire 162 serves to interconnect the wire 152 with one terminal of the accelerator operated switch 92 and the other terminal of said switch is connected by a wire 164 with said solenoid. There is thus provided electrical means for controlling the operation of the solenoid 62, the switches 138 and 160, as disclosed in Figure 3, being connected in parallel in the electrical means interconnecting the switch 90 and said solenoid; and as with the electrical means for controlling the operation of the solenoid 72, the solenoid 62 is controlled by the switch 90 and by either the switch 138 or the switch 160.

Figure 2:
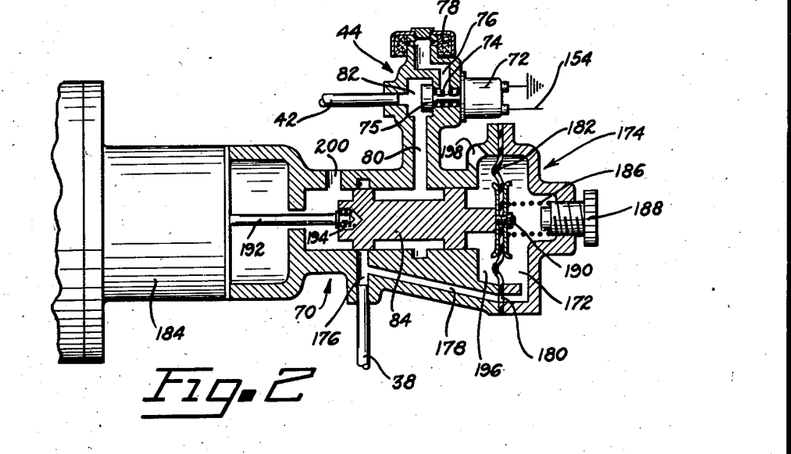
Figure 2 is a view, largely in section, disclosing the details of the so-called second stage 3-way control valve and the so-called 3-way vacuum cutout valve of the embodiment of my invention disclosed in Figure 1.

Describing now the operation of the clutch control mechanism disclosed in Figures 1 and 2, and incidentally completing the description of the valve 70 and valve operating power means disclosed in Figure 2, when the car is at a standstill to close the switch 160 and the accelerator is released to close the switches 90 and 92 of the switch mechanism 86, then the clutch is disengaged; for with the switches 90 and 160 closed the solenoid 72 is energized thereby moving the valve member 76 to the position disclosed in Figure 2. The solenoid 62 is also at this time energized resulting in a movement of the valve member 66 to the position disclosed in Figure 1. A compartment 166 of the vacuum motor 14 is then connected to the conduit 40 which is in turn connected to either the vacuum reservoir 46 or directly to the intake manifold 54. If the reservoir 46 and pump 50 are omitted from the mechanism constituting my invention, then it will of course be necessary to have the engine idling to create a vacuum in the intake manifold to thereby make possible a clutch disengaging operation of the motor 14.

The motor compartment 166, by virtue of its connection with a source of vacuum, is then partially evacuated with a resultant subjection of the power element 16 of the motor 14 to a differential of gaseous pressures; for by virtue of an opening 168 in the motor casing part 22, a compartment 170 of said motor is vented to the atmosphere. Tracing the air transmitting circuit between the compartment 166 and the source of vacuum, this circuit includes the ducts 28 and 36 of the valve 30 and conduits 40 and 42. The power element 16 is then moved to the right as disclosed in Figure 1 to disengage the clutch.

The driver of the car will then probably place the transmission in its lowest forward speed setting by lifting the selector lever 146 upwardly out of the plane in which an operation of said lever operates the switch 138 and then rotate said lever to establish said forward speed setting; or if it is desired to move the car backwardly the driver will, after this upward movement of the selector lever, move said lever to its reverse gear setting. It is to be remembered, too, that if the transmission is of such construction that there are, say, only two forward speed settings of the selector lever, said settings being effected when the lever is moved in the plane resulting in the operation of the switch 138, then both the governor operated switch 160 and the selector lever operated switch 138 serve to control the clutch disengaging operation of the motor 14; and if perchance the governor mechanism which operates the switch 160 were at the time inoperative, then the clutch would nevertheless be disengaged when the selector lever is moved in a certain plane to establish the transmission in a relatively high gear ratio setting.

Continuing the description of the operation of the mechanism, assuming that the transmission, by virtue of an upward or so-called cross shift movement and the subsequent rotative movement, is now established in a relatively low gear ratio setting, the accelerator is now depressed to effect both an opening of the throttle to get the vehicle under way and to effect an engagement of the clutch to make this operation possible. Describing this clutch engaging operation of the mechanism in detail, said operation constituting the most important feature of my invention, when the accelerator is depressed a slight distance the switch 92, as heretofore described, is opened by the spring 110 thereby de-energizing the solenoid 62. The valve member 66 of the first stage valve 30 is then moved downwardly by the spring 64, to cut off the connection between the motor chamber 166 and the vacuum source via the conduit 40 and establish a connection between said chamber and a chamber 172 in a valve operating motor 174 via ducts 28 and 34 of the valve 30, the conduit 38, a duct 176 in the valve 70, another duct 178 in said valve 70 and an opening 180 in a flexible diaphragm 182 of the motor 174.

Completing the description of the power means for operating said valve 70, the movable valve member 84 of said valve is operated by three different power means, namely an engine operated governor 184 of any suitable design, such as the well-known flyball type; the aforementioned pressure differential operated motor 174 comprising casing members having secured therebetween the aforementioned diaphragm 182 and lastly a compression spring 186 interposed between one face of the diaphragm and the shouldered end of an adjusting screw 188 threadedly mounted in the outer motor casing member. The diaphragm 182 is fixedly connected to one end of the valve member 84 by a screw 190 and the governor 184 is connected with said valve member by means of a rod 192 and a spring 194, the latter contacting one end of said rod and fitting within a recess in said valve member.

Continuing the description of the clutch engaging operation of the power means a depression of the accelerator serves to operate the first stage valve 30 and by said operation the motor chamber 166 is connected with the chamber 172 of the motor 174. Now it is to be remembered that the valve member 84 of the valve 70 is at this time in its so-called lapped position disclosed in Figure 2; for with the accelerator released to idle the engine and thereby bringing the governor 184 to its idling position, valve operating motor 174, which is then energized to a certain extent, serves together with the idling governor to move the valve member 84 to its lapped position thereby compressing the spring 186. It is to be explained at this juncture that the valve operating motor 174 is at the time partially energized by virtue of the fact that with the accelerator released the cut-off three-way valve 44 is, by virtue of the closing of the switches 90 and 160 with a resultant energization of the solenoid 72, moved to interconnect the conduit 42 and duct 80; and this interconnection results, during the release of the accelerator, say prior to a gear shifting operation or immediately after the engine is cranked and with the accelerator then released, in the partial evacuation of the compartment 172 of the motor 174, the air transmitting means including the opening 180 in the power element 182 of the motor 174, the ducts 178 and 176, the interior of the valve and the duct 80. The degree of vacuum in the compartment 172 is then of a certain factor, say a 4" mercury vacuum. A compartment 196 of the motor 174 is at all times vented to the atmosphere by virtue of a port 198 in one of the two sections of said motor. Now when the motor 174 is energized by virtue of the differential of pressures acting on its power element 182 the latter is moved to the right to compress the spring 186 and, as described above, move the valve member to the right to lap the valve.

Resuming the description of the clutch engaging operation of the power means when the chamber 166 of the clutch operating motor 14 is connected to the chamber 172 of the motor 174, air from the latter chamber flows into the chamber 166 and this results in initiating an operation of the clutch springs to move the driving element of the friction clutch toward the driven element; and this operation is of course the engaging operation of said clutch. The power element 16 of the motor 14 is connected to the driving clutch plate and when said element is pulled by the clutch springs to the left, Figure 2, there is created by this operation a partial vacuum in the chamber 166 and the chamber 172 connected therewith; and this vacuum, which is higher than the vacuum previously existing in the chamber 172 results in a movement of the valve member 84 to the right to uncover the duct 176 and thereby vent the chamber 172 to the atmosphere via the conduit 38, duct 176, the interior of the valve 70 and a port 200 in the casing of said valve.

Now when the pulling force of the clutch springs, or possibly a single spring if the clutch is so constituted, is reduced to a certain factor, then the gaseous pressure or degree of vacuum in the chambers 172 and 166 reaches the aforementioned certain critical factor; and upon reaching this factor, that is when the gaseous pressure in the chamber 172 is increased to this certain amount, that is the aforementioned 4" mercury vacuum, the spring 186 then serves to move the diaphragm 182 and the valve member 84 connected thereto to the left to again lap the valve as disclosed in Figure 2.

It is to be particularly noted that the parts of the mechanism are so constructed and arranged that this lapping of the valve, with a resultant stopping of the clutch engaging movement of the driving clutch element just short of its engagement with the driven clutch element, occurs, with a normal operation of the accelerator, just before the lost motion between the boss 118 and the stop 123 is completely taken up, that is just before the opening of the throttle is initiated.

The operation of the mechanism just described is what is known in this art as the first and relatively fast stage operation of the clutch operating motor 14. It is to be particularly noted that one important feature of my invention as just described lies in the provision of clutch springs of a certain strength and the construction and arrangement of the parts of the clutch operating mechanism to effect a relatively fast first stage movement of the driving clutch plate, said movement, being terminated just short of the actual contact between the driving and driven clutch plates. If the clutch plates contacted before the throttle was opened, then the car would probably creep, which would, of course, not be desired.

To complete the engagement of the clutch, the driver then continues the depression of the accelerator thereby opening the throttle and increasing the speed of the engine and governor above their idling speeds; and this results in an operation of the governor to move the valve member 84 to the right, Figure 2, to again uncover the duct 176, that is again vent the end of said duct to the atmosphere. Explaining this operation the valve member 84 moves to the right inasmuch as of the three forces which were balanced to maintain the valve lapped the force from the governor is increased whereas the two remaining forces, that is the force of the spring 186 and the force of the diaphragm 182, remain constant. Assuming that the driver wishes to slip the friction clutch into engagement as he would do if parking the car or if getting the car away to a smooth start, he will stop the throttle opening movement or depression of the accelerator, thereby holding the R. P. M. of the internal combustion engine and the governor 184 driven thereby, at the then existing factor.

The valve 70 being again cracked to vent the motor chambers 166 and 172 to atmosphere, the air admitted to the chamber 172 reduces the gaseous pressure in said chamber thereby reducing the differential of pressures acting on the diaphragm 182. When this differential of pressures is reduced, however, it is to be remembered that the force from the governor has been increased with the increased speed of the engine; and when the sum of these two forces is reduced to a certain factor the spring 186 becomes again operative to lap the valve and cut off the flow of air to the motor chambers 172 and 166. The increased amount of air in the chamber 166 results, as previously explained, in a further clutch engaging movement of the driving clutch plate, said plate then moving into contact with the driven clutch plate at a load dependent of course upon the speed of the governor which in turn is directly proportional to the speed of the engine.

It follows then that with the mechanism of my invention, the driver may then further increase the loading of the clutch plates by increasing the speed of the engine and the governor connected thereto. Now it is of course desirable in the control of a vehicle to effect a loading of the clutch plates which is directly proportional to the so-called torque of the engine, said torque being of course directly proportional to the speed of the engine; and this result is attained by the mechanism constituting my invention.

As to the adjustment of the clutch control mechanism of my invention as previously described, the valve 70 is lapped when the governor is at its engine idling speed and the driving clutch plate, in its clutch engaging movement and by virtue of the expansion of the clutch springs, reaches a position just short of contact with the driven clutch plate. There is then a certain degree of vacuum in the motor chamber 172 thereby so balancing the three forces acting on the valve member 84 as to bring said member to its lapped position. Now to increase or decrease this relatively short distance between the clutch plates, it is but necessary to either change the so called weight of the clutch springs, vary the loading of the valve spring 186 by turning the nut 188 or vary the idling speed of the engine.

The clutch engaging operation of the clutch control mechanism of my invention having been described in detail, it follows that it is unnecessary to describe in detail the clutch disengaging operation of said mechanism; for it is simply the reverse of the clutch engaging operation, the accelerator being released either in successive steps to slip the clutch out of engagement or in one movement of constant rate to full accelerator and throttle closed positions, thereby disengaging the clutch quickly and at a constant rate of speed. As to the function of the cut-out switch 90 when the throttle has been opened a predetermined amount, say one-fourth of its movement, this switch is opened thereby providing a means for preventing a disengagement of the clutch until the accelerator is released sufficiently to initiate, say, the last quarter of closing movement of the throttle. This feature of the mechanism of my invention makes it possible for the driver to maintain a relatively low and uniform speed of the vehicle in any setting of the transmission provided of course he does not release the accelerator within its first quarter range of throttle opening movement; for the friction clutch remains engaged until the accelerator is moved into said range. It is to be remembered however that as to the above described operation the vehicle speed, to effect a disengagement of the clutch by the power means of my invention, must be reduced sufficiently to effect a closing of the governor operated switch 160.

Figure 5:
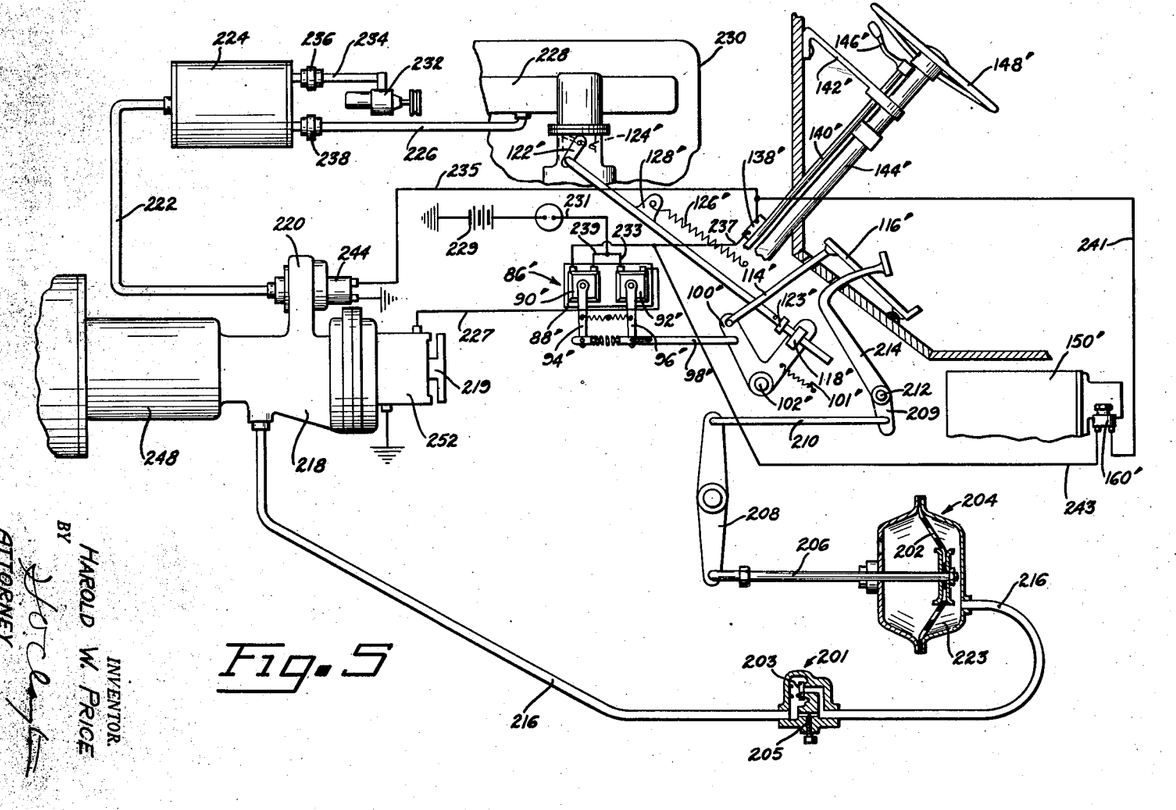
Figure 5 is a view, similar to Figure 1 disclosing another embodiment of the friction clutch control mechanism of my invention.
Figure 6:
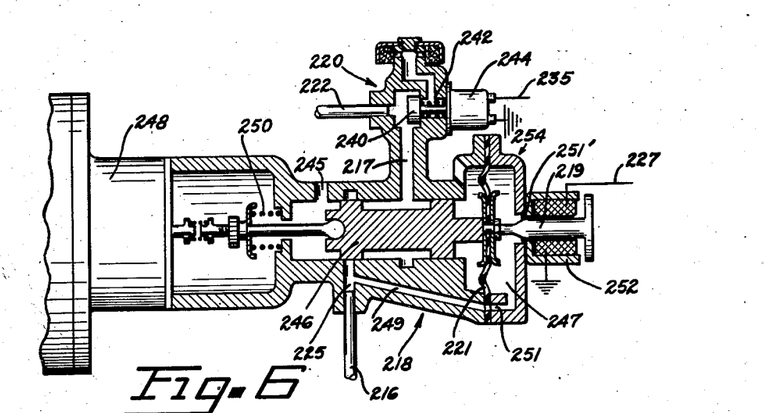
Figure 6 is a view, similar to Figure 2, disclosing in detail the 3-way control valve and the 3-way vacuum cut-out valve of my invention disclosed in Figure 5.

Describing now the embodiment of my invention disclosed in Figures 5 and 6 this power clutch control mechanism functions in substantially the same manner as the previously described mechanism which is shown in Figures 1 to 4 inclusive. As with the latter mechanism there is provided a single acting so-called two stage clutch operating vacuum motor, the means for controlling said motor including means for initiating the first stage clutch engaging operation of said motor and means for controlling the step by step second stage clutch engaging operation of said motor; incidently the mechanism disclosed in both embodiments of my invention may be controlled to effect two stages of clutch disengaging operation of the clutch operating motor. The operation of the latter two means is controlled by means including an electrically controlled vacuum cut-out valve, a vehicle speed responsive governor operated switch, a transmission control selector lever operated switch and an accelerator operated switch mechanism including two successively operated breaker switches. The only major differences in the mechanisms of Figures 1 and 5 lies in the means for controlling the first clutch engaging stage of operation of the clutch operating motor and the electrical hook-up interconnecting the switches and solenoids of the mechanism.

Referring now to Figures 5 and 6, particularly the former, the power element 202 of a single acting clutch operating vacuum motor 204 is operatively connected to the driven element of a conventional friction clutch, not shown, by means including a rod 206, a lever 208, a link 210, a crank 209 and a shaft 212. As with the mechanism of Figure 1 a clutch pedal 214 is provided to manually disengage the clutch when the clutch operating mechanism is inoperative or when a manual operation of the clutch is desired. One end of the motor 204 is connected, by a conduit 216, with a power operated three-way control valve 218; and to a power operated vacuum cut-out valve 220, mounted on the casing of the valve 218, is connected a conduit 222 leading to a vacuum reservoir 224 which may be evacuated by virtue of a connection 226 with the intake manifold 228 of the internal combustion engine 230 of the vehicle and by means of an engine driven vacuum pump 232 connected to the reservoir by a conduit 234. Check valves 236 and 238 may be incorporated in the air transmitting connections 234 and 236 respectively said valves serving to maintain the desired vacuum in the reservoir. If desired an air flow controlling unit 201, including a spring and pressure differential operated check valve 203 and a needle valve type of restricting valve 205, may be incorporated in the conduit 216 to control the flow of air through said conduit.

A movable valve element 240, of the vacuum cut-out valve 220 is moved to the left, Figure 6, by a spring 242 and to the right by a grounded solenoid 244; and a spool shaped valve element 246 of the three-way control valve 218 is subjected to the load of an engine driven centrifugal governor 248 of conventional design, a spring 250, a grounded solenoid 252 and a pressure differential operated motor 254, in the operation of said valve. It is important to note at this juncture that when the accelerator is completely released, thereby closing a switch 92', the solenoid 252 is energized; and when this solenoid is energized its armature 219, which is fixedly connected to the power element 221 of the motor 254, is moved to the left, Figure 6, thereby moving the valve member 246 to the left and connecting a compartment 223 of the motor 204 with the source of vacuum via conduit 216, a duct 225 in the casing of the valve 218, the interior of said valve, a duct 217 in the valve 220 and the conduit 222.

As to the accelerator operated switch mechanism, the accelerator operated means for operating said switch mechanism, the speed responsive governor operated switch, the transmission selector lever operated switch and means for operating the same and the linkage interconnecting the accelerator, the throttle and the switch operating means, the parts of the same duplicate both in the structure and function the corresponding parts disclosed in Figure 1 accordingly said parts are given the same reference numerals with the addition of a prime.

Briefly describing the electrical wiring interconnecting the switches and solenoids of Figure 5 the grounded solenoid 252 is connected to the terminal of the switch 92' by a wire 227 and the other terminal of said switch is connected to a grounded battery by so-called hot wires 233 and 231. The grounded solenoid 244 is wired to the selector lever operated switch 138' by means of a wire 235 and the latter switch is connected to one terminal of the switch 90' by a wire 237. The other terminal of the switch 90' is connected to the wire 231 is connected by means of a wire 239. The governor operated switch 160' is electrically connected in parallel with the switch 138' one terminal of said switch 160' being connected by a wire 241 to the wire 235 and the other terminal of the switch 160' being connected to the wire 237 by the wire 243.

Describing now the operation of the mechanism disclosed in Figures 5 and 6 and completing the description of the parts thereof assuming that the accelerator is released and the vehicle is traveling below governor speed thereby effecting a disengagement of the clutch, to effect a two-stage engagement of the clutch the driver will depress the accelerator. As previously described in connection with the description of the embodiment disclosed in Figure 1 the first increment of throttle opening movement of the accelerator will result in the opening of the accelerator operated switch 92' thereby deenergizing the solenoid 252. This operation results in the first that is relatively fast stage of clutch engaging operation of the motor 204; for when the solenoid 252 is deenergized, and before the throttle is opened to increase the load on the valve member 246 from the centrifugal governor 218, the load on said valve member from the pressure differential operated diaphragm 221 of the then energized motor 254 serves to move said valve member to the right and thereby vent the chamber 223 of the motor 204 to the atmosphere. Air then rushes into the chamber 223 via a port 245 in the casing of the valve 218 the interior of said valve, the duct 225 and the conduit 216; and this immediately results in initiating the clutch engaging movement of the diaphragm 202 of the motor 204 under the action of the clutch springs. As previously described the pull of the clutch springs immediately results in the creation of a vacuum in the chamber 223 of the motor 204 and incidently also creates a vacuum in a chamber 247 of the motor 254 said latter chamber being connected to the duct 225 by a duct 249 and an opening 251 in the diaphragm 221. A gland 251', interposed between the armature 219 and the casing of the motor, serves to prevent a leakage of air into the compartment 247. The movement of the diaphragm 202 of the motor 204 continues until the pulling force of the clutch springs is reduced to a certain factor whereupon the then existing gaseous pressure in the chamber 247, which pressure progressively rises as the pull of the clutch springs progressively decreases, makes possible the lapping of the valve 218 the valve member 246 thereof taking the position disclosed in Figure 6. Now this operation is the same as that previously described and it is also to be noted that when the valve 218 is lapped to arrest the movement of the diaphragm 202 and the driven clutch plate connected therewith, that the clutch plates are still separated a slight amount.

As to the remainder of the clutch engaging operation of the mechanism disclosed in Figures 5 and 6, that is the step by step second stage of clutch engaging movement of the diaphragm 202, this operation is the same as the operation of the clutch control mechanism of Figures 1 to 4 inclusive, said operation having been described in detail above.

There is thus provided a simple and compact two-stage friction clutch control mechanism controlled by an operation of either the selector lever or the vehicle speed responsive governor together with an operation of the accelerator. With the mechanism of my invention there is no need, save when the power means is inoperative, or prior to cranking the engine when the transmission is left in gear, to manually operate the clutch pedal to disengage the clutch; for the vehicle speed responsive governor and the accelerator when released effect a disengagement of the clutch when the vehicle is at a standstill or is traveling at a very low speed and the operation of the selector to establish the transmission in certain gear settings effects, together with the released accelerator, a disengagement of the clutch to facilitate said operation of the transmission. With the mechanism of my invention the degree of load of the clutch plates is directly proportional to the speed of the engine and said plates are not loaded until the accelerator is depressed sufficiently to open the throttle. In other words of the three controls, that is the selector lever the accelerator and the vehicle speed responsive governor, the accelerator is the only control means for effecting the actual contact loading of the clutch plates. By incorporating the mechanism of my invention in the power plant of the vehicle, the driving force of the engine to meet the demands placed upon it in driving the vehicle is directly proportional to the degree of resistance offered by the engaged friction clutch. With many present day clutch control mechanisms the loading of the clutch plates, resulting in a resistance to rotation of the engine, is a function of the degree of depression of the accelerator; however, this operation does not accurately reflect the ability or so-called torque of the engine to drive the vehicle. It is submitted, therefore, that my invention constitutes an improvement over such clutch control mechanisms.

I claim:

1. In an automotive vehicle provided with an accelerator and a friction clutch having a driving element, a driven element and yieldable means for forcing said elements into contact with each other to effect an engagement of the clutch, power means for operating said clutch including a pressure differential operated motor having its power element operably connected to one of the aforementioned clutch elements, means for controlling the clutch engaging operation of said motor comprising a remotely controlled pressure balanced three-way valve and means for controlling the operation of said valve to effect first a relatively rapid clutch engaging movement of the power element of the motor at a constant or substantially constant rate of speed and then effect a succession of clutch engaging movements of said power element to complete the engagement of the clutch, said valve controlling means including an accelerator controlled solenoid operated cut-off valve, an engine operated governor, said governor serving, together with other valve controlling means, to control the three-way valve to effect the aforementioned succession of clutch engaging operations of the motor.

2. In an automotive vehicle provided with an internal combustion engine having an intake manifold, an accelerator, an engine operated governor, a change-speed transmission and means interconnecting the engine and transmission including a friction clutch comprising a driving element connected with the engine, a movable driven element connected with the transmission by means including force transmitting means and clutch spring means for forcing the two clutch elements together to effect an engagement of the clutch, power means controlled in part by an operation of the governor, the clutch spring means and the accelerator, said power means being capable of disengaging the friction clutch by first moving the force transmitting means connected to the driven clutch element a plurality of successive steps in a direction to change the loading of the two clutch elements, then moving the driven clutch elements slightly out of contact with the driving clutch element and lastly further moving the driven clutch element, at a constant or substantially constant speed, to increase the separation of the two clutch elements, said power means comprising a pressure differential operated motor the power element of which is operably connected to the driven clutch element, air transmitting means for venting said motor to the atmosphere and for interconnecting said motor with the intake manifold, a pressure balanced three-way valve, incorporated in a part of said air transmitting means, for controlling the operation of the motor, means for operating said valve including force transmitting means interconnecting said valve with the governor, a spring and a pressure differential operated motor and means for controlling the operation of said valve operating means.

3. In an automotive vehicle provided with an internal combustion engine having an intake manifold, an engine operated governor, an accelerator, a change-speed transmission, means for controlling the operation of the transmission and means interconnecting the engine and transmission including a friction clutch comprising a driving element connected with the engine, a movable driven element connected with the transmission by means including force transmitting means and clutch spring means for forcing the two clutch elements together to effect an engagement of the clutch, power means, controlled in part by an operation of the governor the clutch spring means and the accelerator, said power means being capable of disengaging the friction clutch by first moving the aforementioned force transmitting means in a plurality of successive steps in a direction to change the loading of the two clutch elements, then moving the driven clutch element slightly out of contact with the driving clutch element and lastly further moving the driven clutch element, at a constant or substantially constant speed, to increase the separation of the two clutch elements, said power means comprising a pressure differential operated motor the power element of which is operably connected to the driven clutch element, air transmitting means for interconnecting said motor with the intake manifold and for venting said motor to the atmosphere, a pressure balanced three-way valve, incorporated in a part of said air transmitting means, for controlling the operation of the motor, means for operating said valve including force transmitting means interconnecting said valve with the aforementioned governor, a spring and a pressure differential operated motor and means for controlling the operation of said valve operating means including a solenoid operated valve incorporated in the air transmitting means between the three-way valve and the intake manifold and a switch, operated by the transmission controlling means, for controlling the operation of said solenoid.

4. In an automotive vehicle provided with an internal combustion engine having an intake manifold, an accelerator, an engine operated governor, a change-speed transmission and means interconnecting the engine and transmission including a friction clutch comprising a driving clutch element connected with the engine, a movable driven clutch element connected with the transmission by means including force transmitting means and clutch spring means for forcing the two clutch elements together to effect an engagement of the clutch, power means, controlled in part by an operation of the governor the clutch spring means and the accelerator, said power means controlling the engagement of the friction clutch by first effecting a relatively rapid movement of the driven clutch element toward the driving clutch element at a constant or substantially constant rate of speed, said movement being stopped when the potential energy of the clutch spring means is reduced to a predetermined factor, the clutch elements then being only slightly separated, the power means then being operable to effect the necessary slight movement of the driven clutch element to move said element into contact with the driving clutch element, and lastly the power means being operative to effect, by a plurality of movements of the force transmitting means connected with the driven clutch element, a plurality of different loadings of the driven clutch element when said element is contacting the driving clutch element, said power means including a pressure differential operated motor the power element of which is operably connected to the driven clutch element, air transmitting means interconnecting the manifold and motor a pressure balanced three-way valve, incorporated in said air transmitting means, for controlling the operation of said motor, means for actuating said valve comprising a pressure differential operated motor, a spring and force transmitting means interconnecting the valve with the aforementioned governor, means cooperating with the accelerator and the clutch spring means when the same expand for controlling the operation of said valve actuating means including a cut-off valve incorporated in the air transmitting means between the intake manifold and the three-way valve, a solenoid for operating said cut-off valve and means for controlling the operation of said solenoid including an accelerator operated switch mechanism.

5. In an automotive vehicle provided with an internal combustion engine having an intake manifold, an accelerator and a friction clutch including clutch engaging spring means, power means for operating said clutch comprising a pressure differential operated motor operably conected to the clutch, air transmitting means for interconnecting said motor with the intake manifold and for venting said motor to the atmosphere, a three-way pressure balanced valve incorporated in said air transmitting means, means for operating said valve comprising an engine operated governor, a spring and a pressure differential operated motor and means, cooperating with the accelerator and the clutch spring means, for controlling the operation of said three-way valve operating means including a cut-off valve, a solenoid for operating said cut-off valve and means for controlling the operation of said solenoid including an accelerator operated switch mechanism, a vehicle speed responsive governor operated switch and a transmission controlling selector lever operated switch.

6. In an automotive vehicle provided with an internal combustion engine and a friction clutch said clutch having driving and driven clutch elements, power means for operating said clutch including a single ended clutch operating pressure differential operated motor, a pressure balanced three-way valve for controlling the operation of said motor and means for operating said valve including engine operated means operative directly in accordance with the R. P. M. of the engine, a spring and a single ended pressure differential operated motor the latter being so connected with the clutch operating motor and the power means being so operative that the gaseous pressure within said motors is the same or substantially the same when the clutch is being engaged, said motor, spring and engine operated means each, when energized, exerting a force tending to move the valve away from its lapped position, the three forces being, however, of such degree as to result in a lapping of the valve when the governor speed is held constant at any one of a plurality of different speeds and the gaseous pressure within the clutch operating pressure differential operated motor is such as to effect either a slight separation of the clutch elements or any one of a plurality of loadings of said elements.

7. In an automotive vehicle provided with an accelerator and a friction clutch having a driving element and a driven element, power means for operating said clutch comprising a pressure differential operated motor and means for controlling the operation of said motor comprising a balanced type of three-way valve, means for controlling the operation of said valve including a cut-off valve, a solenoid for operating said cut-off valve and means for controlling the operation of said solenoid comprising an accelerator operated switch mechanism and further including a vehicle speed responsive governor operated switch and a manually operated transmission controlling selector operated switch.

8. In an automotive vehicle including an internal combustion engine, an accelerator and a friction clutch comprising a driving element, a driven element, and spring means for forcing said elements into contact with each other, power means for operating said clutch comprising a pressure differential operated motor having its power element operably connected to one of said clutch elements, means for controlling the operation of said motor comprising a pressure balanced three-way valve, means for operating said valve including a spring, an engine operated governor, a pressure differential operated motor, and a solenoid and means, cooperating with the accelerator and clutch operating spring means, for controlling the operation of said valve operating means comprising an accelerator operated switch mechanism for controlling the operation of said solenoid, a cut-off valve, and a solenoid for operating said cut-off valve the latter solenoid also being controlled by said accelerator operated switch mechanism.

9. In an automotive vehicle provided with an internal combustion engine, an accelerator and a friction clutch comprising a driving element, a driven element and spring means for forcing said elements together to effect an engagement of the clutch, power means for disengaging the clutch by compressing the spring means and for controlling the engagement of the clutch by controlling the expansion of said spring means, said power means including a pressure differential operated motor having its power element connected to one of the aforementioned clutch elements, a pressure balanced three-way valve for controlling the operation of said motor and means, cooperating with the accelerator and the aforementioned spring means, for operating and controlling the operation of said valve, said control and operating means comprising a spring, a pressure differential operated motor and an engine operated governor for operating said valve and means including an accelerator controlled cut-off valve for in part controlling the operation of said valve operating means.

10. In an automotive vehicle provided with an accelerator and a friction clutch comprising an element movable into firm engagement with another element to engage the clutch and movable away from said element to disengage the clutch and further comprising spring means for effecting said movement, power means for so controlling the operation of the movable clutch element as to effect a slippage or relative movement of the two contacting clutch elements either when the clutch is being disengaged or when the same is being engaged and for effecting a relatively rapid movement of the movable clutch element either away from or toward the remaining clutch element when the clutch is being disengaged and engaged respectively, said power means including a pressure differential operated motor, a pressure balanced three-way valve for controlling the operation of said motor, means for operating said valve to effect the aforementioned clutch controlling operation of the power means, said valve operating means comprising a spring, a pressure differential operated motor and an engine operated governor and means, cooperating with the accelerator and the aforementioned clutch spring means, for controlling the operation of said spring, pressure differential operated motor and governor, said controlling means comprising a cut-off valve, a solenoid for operating said cut-off valve and an accelerator operated switch mechanism for controlling the operation of said solenoid.

11. In an automotive vehicle provided with a friction clutch including a driving element and a driven element, an internal combustion engine including a carburetor having a throttle valve, an accelerator and means interconnecting said throttle valve and accelerator including a lost motion connection, power means for operating the friction clutch, said power means including a pressure differential operated motor the power element of which is operably connected to one of the aforementioned clutch elements, a three-way valve for controlling the operation of said motor, means for operating said valve including a spring, a pressure differential operated motor and an engine operated governor, said three operating means being operable to open, close and lap said valve and means for controlling the operation of said valve operating means comprising accelerator controlled means operative, during the first increment of movement of the accelerator when the same is depressed and before the lost motion in the throttle operating linkage is taken up, to effect an operation of the valve operating means which results in an operation of the three-way valve to effect a relatively rapid clutch engaging movement of the power element of the clutch operating motor, said movement being at a constant or substantially constant speed.

12. In an automotive vehicle provided with a friction clutch including a driving element and a driven element, an internal combustion engine including a carburetor having a throttle valve, an accelerator and means interconnecting said throttle valve and accelerator including a lost motion connection, power means for operating the friction clutch, said power means including a pressure differential operated motor the power element of which is operably connected to one of the aforementioned clutch elements, a three-way valve operable to control the operation of said motor, means for operating said valve including a spring, a pressure differential operated motor, a solenoid and an engine operated governor, the spring, governor and motor of said four operating means being operable to open, close and lap said valve and the solenoid being operable to open said valve and means for controlling the operation of said valve operating means comprising accelerator controlled means operative, during the first increment of movement of the accelerator when the same is depressed and before the lost motion in the throttle operating linkage is taken up, to effect an operation of the solenoid of the valve operating means which results in an operation of the three-way valve to effect a relatively rapid clutch engaging movement of the power element of the clutch operating motor, said movement being at a constant or substantially constant speed.

13. In an automotive vehicle provided with an internal combustion engine, an accelerator and a friction clutch, power means for operating said clutch comprising a pressure differential operated motor, means for controlling the operation of said motor comprising a three-way valve, means for operating said valve comprising a spring, a pressure differential operated motor and an engine operated governor, said three operating means being operative to open, close and lap said valve and means for controlling the operation of said valve operating means comprising accelerator controlled means operative during the last part of the release movement of the accelerator and during the first part of the movement of the accelerator as the same is depressed.

14. In an automotive vehicle provided with an internal combustion engine, an accelerator and a friction clutch, power means for operating said clutch comprising a pressure differential operated motor, means for controlling the operation of said motor comprising a three-way valve, means for operating said valve comprising a spring, a pressure differential operated motor and an engine operated governor, said three operating means being operative to open, close and lap said valve and means for controlling the operation of said valve operating means comprising a three-way cut-off valve, a solenoid for operating said valve and an accelerator operated switch for controlling the operation of said solenoid.

15. In an automotive vehicle provided with an internal combustion engine, an accelerator and a friction clutch, power means for operating said clutch comprising a pressure differential operated motor, means for controlling the operation of said motor comprising a three-way valve, means for operating said valve comprising a spring, a pressure differential operated motor and an engine operated governor, said three operating means being operative to open, close and lap said valve and means for controlling the operation of said valve operating means comprising a three-way cut-off valve, a solenoid for operating said cut-off valve and an accelerator operated switch mechanism for controlling the operation of said solenoid, and further comprising another three-way valve, a solenoid for operating said last mentioned valve, said latter solenoid being controlled by the aforementioned accelerator operated switch mechanism.

16. In an automotive vehicle provided with a friction clutch, power means for operating said clutch comprising a pressure differential operated motor, valve means for controlling the operation of said motor comprising a movable valve member, and means for moving said member including a spring, the power element of a pressure differential operated motor, the armature of a solenoid and a governor operative in accordance with the speed of the engine of the vehicle, all four of said latter valve operating elements being capable of exerting a force tending to move said valve member.

17. In an automotive vehicle provided with a friction clutch, power means for operating said clutch comprising a pressure differential operated motor, valve means for controlling the operation of said motor comprising a fixed valve member and a movable valve member and means for moving said latter member to thereby effect either a clutch disengaging or clutch engaging operation of the motor including a spring, a pressure differential operated power element constituting a part of a motor mounted on the fixed valve member, the armature of a solenoid and a governor operative in accordance with the speed of the engine of the vehicle, all four of said valve operating elements being capable of exerting a force tending to move said valve member.

18. In an automotive vehicle provided with a friction clutch, power means for operating said clutch comprising a pressure differential operated motor, valve means for controlling the operation of said motor comprising a fixed valve member and a movable valve member and means for moving said latter member to thereby effect either a clutch disengaging or clutch engaging operation of the motor including a spring, a pressure differential operated power element constituting a part of a motor mounted on the fixed valve member, the armature of a solenoid and a governor operative in accordance with the speed of the engine of the vehicle, all four of said valve operating elements being capable of exerting a force tending to move said valve member and means interconnecting said governor and movable valve member including a yieldable spring.

19. In an automotive vehicle provided with an internal combustion engine, an accelerator, an accelerator operated throttle valve and a friction clutch comprising a driving element and a driven element, one of said elements being movable away from the other element, and clutch engaging yieldable means for forcing said elements into contact with each other to effect an engagement of the clutch, power means operative to disengage the clutch by a compression of the yieldable means and operative to control the expansion of the latter means to control the engagement of the clutch, said power means comprising a pressure differential operated motor having its power element operatively connected to the aforementioned movable clutch element and further comprising means for controlling the clutch disengaging operation of said motor to effect, by a succession of release movements of the accelerator, a step by step or clutch slipping movement of the latter clutch element to diminish the loading of the clutch elements when the same are in contact with each other, the last step or increment of movement of the movable clutch element being effected with the closing of the throttle valve, said increment serving to just slightly separate said clutch elements and compress the clutch engaging yieldable means a predetermined amount, the motor controlling means then serving, upon completely or substantially completely releasing the accelerator, to effect an operation of the motor to separate the clutch elements an appreciable distance, said motor controlling means comprising a three way valve, means for actuating said valve comprising a pressure differential operated motor, a spring and an engine operated governor and means, cooperating with the accelerator, for controlling the operation of said valve actuating means, said latter control means including an accelerator operated switch mechanism and a solenoid operated cut-off valve the latter being operative, when the accelerator is released to or beyond a certain position, to make possible the above described clutch disengaging operations of the clutch operating motor.

20. In an automotive vehicle provided with an internal combustion engine having an intake manifold, an accelerator and a friction clutch having a driving element, a driven element and clutch spring means for forcing one of said elements into contact with the other element to effect an engagement of the clutch, power means for operating said clutch comprising a single acting pressure differential operated motor having its power element operably connected to the clutch element which is biased by the spring means to its clutch engaged position, a three-way follow-up valve for controlling the clutch engaging and clutch disengaging operations of said motor, said valve including a fixed member, having an atmospheric vent port and two vacuum ports therein, and a movable member reciprocable within said fixed member, means including a spring, an engine operated governor and a single acting pressure differential operated motor for operating said valve, said governor, when its speed of operation is being increased, and said motor when energized tending to move the movable valve member in a direction to vent the two motors to the atmosphere, said movement being opposed by the spring which biases said movable valve member toward a position to interconnect the vacuum ports of the valve, a fluid transmitting connection interconnecting one of the aforementioned valve ports with the manifold, fluid transmitting means interconnecting another of said valve ports with both of said motors, and means cooperating with the accelerator in its operation of in part controlling the operation of the governor and cooperating with the clutch spring means in its operation of in part controlling the gaseous pressure within the clutch operating motor, for controlling the operation of said valve operating means to effect a plurality of follow-up-to-lap operations of the valve to thereby effect a corresponding plurality of increments of clutch disengaging and clutch engaging movement of the power element of the clutch operating motor.

HAROLD W. PRICE.